Feb. 12, 1952     J. C. MACFARLANE ET AL     2,585,145
SYNCHRONOUS DYNAMOELECTRIC MACHINE
Filed Dec. 14, 1946     2 SHEETS—SHEET 1
FIG: 1.
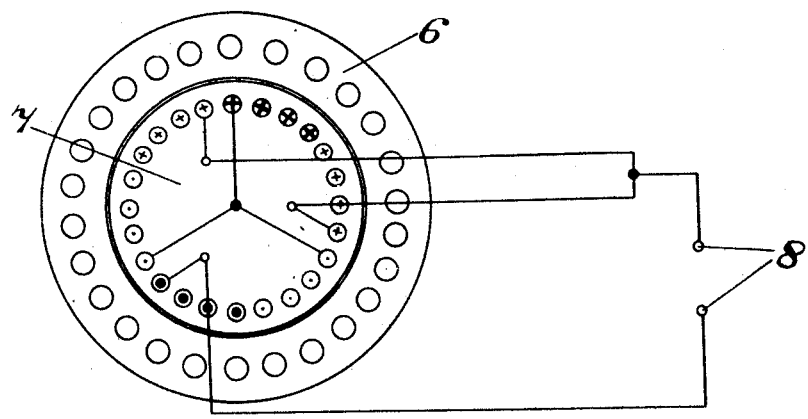
FIG: 2.
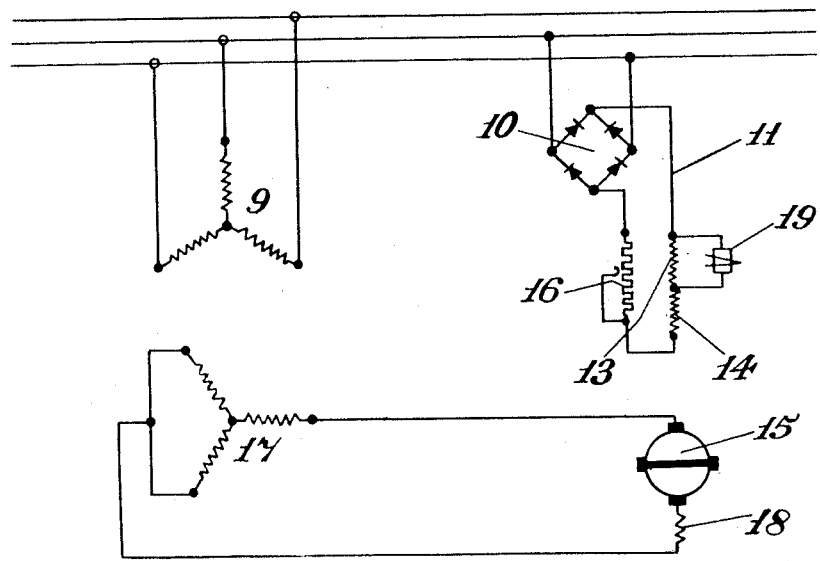
Inventors,
James C. Macfarlane
William I. Macfarlane
By Young, Emery & Thompson
Attys.

Feb. 12, 1952    J. C. MACFARLANE ET AL    2,585,145
SYNCHRONOUS DYNAMOELECTRIC MACHINE
Filed Dec. 14, 1946      2 SHEETS—SHEET 2
FIG: 3.
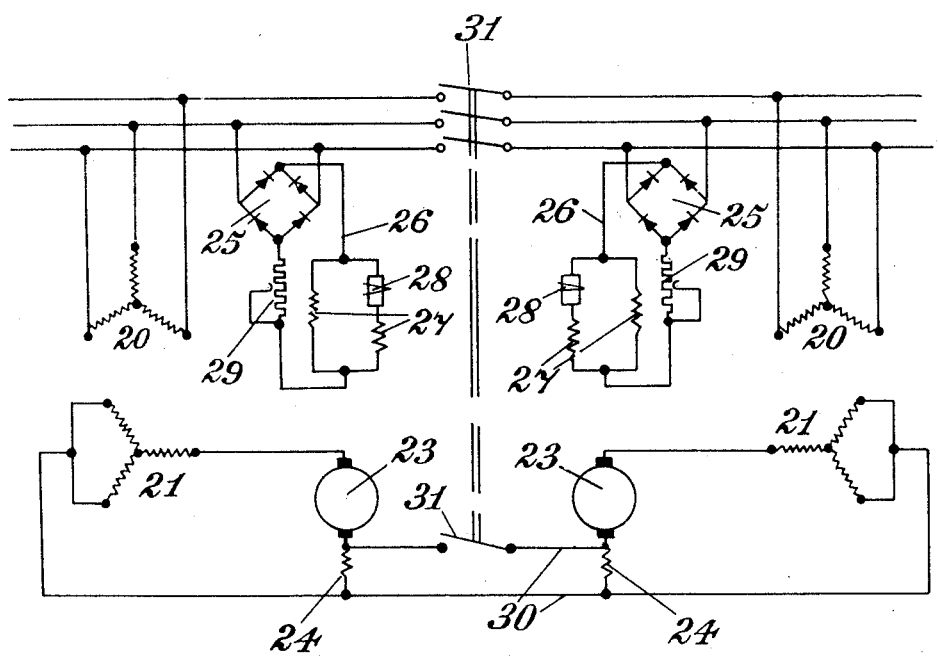
FIG: 4.
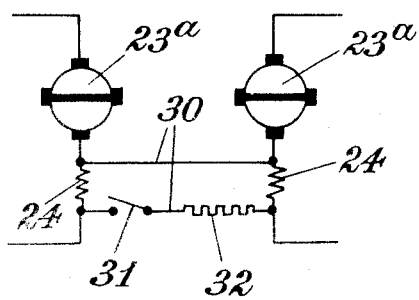
FIG: 5.
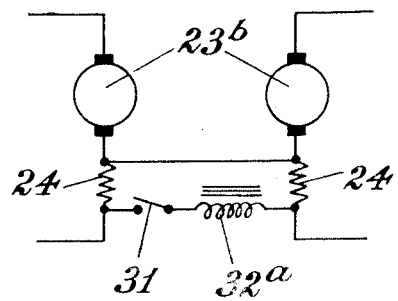
Inventors,
James C. Macfarlane
William I. Macfarlane
By Young, Emery & Thompson
Attys.

UNITED STATES PATENT OFFICE 2,585,145

SYNCHRONOUS DYNAMOELECTRIC MACHINE

James Colquhoun Macfarlane and William Ian Macfarlane, Cathcart, Glasgow, Scotland Application December 14, 1946, Serial No. 716,382
In Great Britain October 12, 1945

Section 1, Public Law 690, August 8, 1946
Patent expires October 12, 1965

7 Claims. (Cl. 322—59)

This invention relates to synchronous alternators.

In previously proposed synchronous alternators, for good inherent regulation and transient stability it has been usual to use salient field poles and constant excitation, necessitating a high airgap density, a long gap length, and a strong field. When such machines are required to give a substantially level terminal voltage with varying load, it is necessary to use an automatic voltage regulator of which the carbon-pile, or vibrating contact, types are representative.

In accordance with the present invention, we provide, in combination, a synchronous alternator, having a multi-phase direct current field winding on a non-salient polar field construction, an exciter which is a direct current generator having a fast response to changes in the load circuit of the alternator and is itself excited by direct current which is a measure of the alternating current voltage in the alternator load circuit, and means electrically associating said load circuit with said exciter, so that variations in the load influence the exciter whereby the excitation of the alternator quickly changes in correspondence with said load variations.

Suitable exciters for the above purpose are these of the cross field and other high amplification types, for example described in our U. S. A. application Serial No. 535,408, now Patent No. 2,438,567 issued March 30, 1948, and in the specification of our U. S. A. application Serial No. 764,358, now Patent No. 2,562,052 issued July 24, 1951. The exciter field may be connected to the load circuit by a control circuit supplied from the load circuit in such a way as to respond to load changes and alter the excitation of the synchronous alternator to suit the new conditions very quickly, whereby the excitation is continually and automatically varied in accordance with load changes, and high transient stability is obtained, while the machine is of simple and compact nature.

If such a multi-phase direct current field winding on a non-salient polar field construction is supplied with an excitation which is at all times a function of the load, then its action may be considered as the action of its two components, one providing excitation the other acting as a compensating winding for the armature reaction.

As the armature reaction of a normal armature for an alternator approaches very closely a sinusoidal shape, it is necessary that the component of the field which opposes the armature reaction (and hence the field M. M. F. itself) also has a sinusoidal shape. This is not possible with a salient pole field shape, nor is it possible with a non-salient polar construction as normally constructed where the wave shape is that of a truncated triangle. In our machine the multiphase construction automatically gives a sinusoidal field M. M. F. so that complete compensation may be achieved.

As a measure of the advantage obtained by the combination of a fast exciter with the non-salient pole multiphase wound field alternator, in accordance with this invention, the following relative sizes are representative for machines having the same length of iron core:

Diameter of frame of non-salient multiphase field alternator=1.

Diameter of frame of non-salient single phase field alternator=1.1.

Diameter of frame of salient pole single phase field alternator=1.25.

Thus a reduction in iron volume and therefore in machine size is obtained such that an alternator to our construction will be about 35% smaller in size than an equivalently rated salient pole machine and about 18% less in size than a non-salient pole machine with a non-trapezoidal flux wave shape.

However, such a field winding must be supplied quickly and automatically with sufficient excitation to provide the main field and the required armature compensation, and for this the exciter must be able to react quickly to output voltage changes and to be controlled in such a way as to vary the excitation in the desired way, that is to say, the exciter must be "fast."

Since complete compensation of armature reaction is achieved, airgap lengths may be made as small as is mechanically desirable and field windings need therefore be much smaller than in a salient pole, constant excitation, machine. In addition, since the multiphase winding is effectually short-circuited through the exciter armature, the winding acts as an amortisseur induction winding to prevent hunting of the alternator when two are paralleled, and also has the valuable effect of eliminating or reducing pulsation due to armature reaction in single phase armature machines.

As is well known by alteration of the pitch of the distributed winding in relation to the pitch between adjacent poles, the shape of the direct current field may be altered so as to control the output wave shape of an alternator, and to eliminate harmonics in the voltage wave. The above construction allows this to be carried out by varying the pitch of the distributed winding.

Further, it is well known that difficulty is experienced when synchronous alternators are run in parallel when they have a slightly drooping, level, or rising volt-ampere characteristic, and special arrangements have to be made to overcome this. Further in conventional automatic voltage regulator systems, to control the sharing of the load between the paralleled alternators it is necessary to use current transformers or other apparatus to balance the regulator settings and obtain good load-sharing between the various alternators.

When synchronous alternators as herein described are run in parallel, similar difficulties may be experienced particularly if level or rising volt-ampere characteristic machines are used. Suitable exciters for synchronous alternators may be of the cross-field type, an example being described in U. S. A. application Serial No. 535,408, and other high amplification types may be utilised. In such exciters the armature reaction in the axis of the control circuit windings is compensated-out by a winding on the field structure and, by under or over compensating this armature reaction, the compounding of the exciter may be varied. In addition, since the compensating winding has to balance out the armature reaction it is powerful in comparison to the control windings, and a very small change in current through the compensating windings will have a relatively powerful effect. During parallel operation of the alternators one machine may tend (even momentarily) to supply the second, causing the armature current of the second machine to reverse. This is particularly the case when a considerable load on the two alternators is suddenly switched off, when reversal of armature current will cause a transient reversed E. M. F. (electromotive force) in the field of the alternator which, in turn, may cause reversal of the field current and therefore of the exciter compensating winding. Since the compensating winding is relatively powerful, remanent magnetic polarity of the control poles may thus be overcome or reversed so that control is lost and the exciter will not excite or will build up a voltage in the reversed direction.

In addition unless the characteristics of the alernators in parallel are identical the load will not be shared evenly between the various alternators.

A further object of the invention is to overcome or mitigate the foregoing difficulties.

In further accordance with the present invention, therefore, we provide in combination, a plurality of synchronous alternators, each having a multi-phase direct current field winding on a non-salient polar field construction, an exciter for each alternator which is a direct current generator having a fast response to changes in the load of the alternator and is itself excited by direct current which is a measure of the alternating current voltage in the alternator load circuit, means electrically associating the load circuit of each alternator with its exciter so that variations in the load influence the exciter whereby the excitation of the alternator quickly changes in correspondence with said load variations, field winding means for each exciter compensating for the armature reaction of each of the alternators, and electrical connections or links linking the said respective exciter field compensating winding means in parallel so that change of field current in such compensating winding for any one alternator causes a corresponding, equalising, change in all such compensating windings.

We will now describe some embodiments of the invention simply by way of example with reference to the accompanying drawings which are diagrammatic and whereon:

Fig. 1 shows the alternator field connections.

Figs. 2 and 3 show examples of the invention.

Figs. 4 and 5 show details which may be utilised in the Fig. 3 example.

In Fig. 1, 6 is the armature and 7 is the rotating member which in this case is the field. The field is of multiphase direct current type shown in this example as three-phase star connected; any multi-phase winding is suitable. The poles of the polar field body are of non-salient type and terminals 8 lead to the exciter.

In Fig. 2 the alternator windings are shown only diagrammatically, and as will be seen the alternator armature 9 is connected through a rectifier 10 to a control circuit 11 in which is connected field windings 13 and 14 for the exciter 15. In parallel with field winding 13 is a non-linear resistance 19 of the type described in our U. S. A. application Serial No. 535,408, and a regulator is indicated at 16.

The exciter is of the type described in U. S. A. application Serial No. 535,408 and in its armature circuit has a compensating winding 18 such armature circuit short circuiting the alternating field windings 17 and said compensating winding compensating for armature reaction of the exciter.

As will be evident the alternator armature is of the three-phase type and the alternator field winding is likewise of three-phase type, both being star connected, and the excitation of windings 17 and 18 is direct current. As will be evident the excitation is supplied to winding 17 through two phases in parallel in series with the third phase. This construction acts both as a distributed direct-current winding, and also, since the three phases are short-circuited through the exciter armature it acts as an induction winding to prevent hunting. This winding may be short-chorded to obtain any desired magneto motive force wave shape.

The rectifier may conveniently be of the metal plate type and may be arranged as a single or as a three-phase bridge, and alteration in the terminal voltage of the alternator is immediately corrected by a rapid change in the field of the main machine. If necessary, the synchronous alternator may be compounded to give a rising, level, or falling characteristic with load, by alteration of the compensating winding of the exciter as described in U. S. A. application Serial No. 535,408.

Any multi-phase winding is of course suitable in the alternator field.

In Figure 3 there are shown two alternator armatures 20 and two alternator fields 21 each of three-phase type as before, and the fields are connected as before to two individual exciters 23 of the type described in our U. S. A. application Serial No. 611,116, now abandoned. Each exciter has a compensating winding 24 as already described, while each exciter field is connected through a rectifier 25 with the load circuit of the alternator, the rectifiers each feeding a corresponding control circuit 26 having exciter field windings 27, a non-linear resistance 28 and a regulator 29.

As shown paralleling connections or links extend between each exciter circuit, from ends of the compensating windings, as at 30. A paralleling switch 31 is provided in the alternator load circuit and opens and closes at the same time as the paralleling switch 31 in one of the links 30.

Since the effect of a small change of current in a compensating winding is powerfully amplified, any tendency for one alternator to supply another is immediately corrected, eliminating the possibility of reversal of one alternator during load changes. In addition, if one alternator tends to supply more than its share of the load, the effect of the increased field current in that machine is transferred to the compensating winding of the other so that the field of the second machine is boosted up and very close load-sharing is obtained.

The correcting impulses of current obtained by these means have been so powerful that, in practice, it has been found desirable in some cases to reduce them to prevent a tendency to hunting between the paralleled alternators. This damping is conveniently carried out by means of resistance or inductance inserted in the equalising link. The value of this damper is not critical. A resistance damper has been found to work satisfactorily over a resistance range of 20:1.

The changes of current required in the various compensating windings to achieve the desired corrections are very small, and the equalising links, and the damping components (if necessary) need therefore only be capable of carrying very small currents. In practice it is often convenient to have a small equalising switch and damper for each alternator to be connected as required.

In Figure 4 a damping resistance is shown at 32, the other parts and references in this diagram being similar to Figure 3 except that the exciters 23a in this example may be of the type described in our U. S. A. application Serial No. 535,408.

Again in Figure 5 the parts and references are similar to Figures 3 and 4 except that in this case the damper 32a is of the reactance type, and for the sake of variation the exciters 23b are again of the type described in our U. S. A. application Serial No. 764,358.

It will be understood that we do not limit ourselves to using these particular combinations of control circuit, exciter, and dampers, as these may be of any of the various types described.

We claim:

1. A system for regulating synchronous alternators of the type including a multiphase armature winding, a multiphase field winding and an exciter for the alternator; comprising compensating winding means in series with the exciter armature and compensating for armature reaction of the exciter, a connection which short-circuits the alternator field winding through the armature and the compensating winding means of the exciter, a direct current control circuit carrying current which is a measure for the alternating current voltage in the alternator load circuit, field windings for said exciter energized by said control circuit, and the combination of a non-salient polar field body in the alternator, said multiphase field winding on said body, an occurrance of transient conditions in the alternator, having induced therein alternating current from said alternator armature windings, the exciter for the alternator being of the direct current cross field type exciting said multiphase winding and having a fast response to changes in the load circuit of said alternator, and said multiphase windings being short-circuited through the exciter armature as aforesaid.

2. A system as claimed in claim 1, in which the multiphase field winding on said body comprises three windings star-connected as for three-phase operation but the remote ends of two being joined together in parallel.

3. A system for regulating a plurality of synchronous alternators each of the type including a multiphase armature winding, a multiphase field winding and an exciter for the alternator; comprising compensating winding means in series with each exciter armature and compensating for armature reaction of the exciter, a connection which short-circuits each alternator multiphase field winding through the armature and the compensating winding means of the corresponding exciter, a direct current control circuit for each exciter carrying current which is a measure of the alternating current voltage in the alternator load circuit, field winding means for each exciter energised by its control circuit; and, for each alternator, the combination of a non-salient polar field body in the alternator, said multiphase field winding on said body, on occurrance of transient conditions in the alternator, having induced therein alternating current from the corresponding alternator armature windings, the exciter being of the direct current cross field type exciting said multiphase field winding and having a fast response to changes in the load circuit of the alternator, said multiphase field winding being short circuited through the exciter armature as aforesaid; and electrical connections linking the respective exciter compensating winding means in parallel so that change of field current in such compensating winding means for any one alternator causes a corresponding equalising change in all such compensating winding means in order to tend to correct unbalance between the respective alternators.

4. A system as claimed in claim 3, in which electrical damping means is provided in the connections linking the respective exciter compensating winding means.

5. A system as claimed in claim 3, in which the multiphase field winding for each alternator comprises three windings star-connected as for three-phase operation, but the remote ends of two being joined together in parallel.

6. A system as claimed in claim 1, in which the field windings in the control circuit for the exciter comprise at least two separate windings in series, and a non-linear resistance in parallel with one of these separate windings.

7. A system as claimed in claim 1, in which the field windings in the control circuit for the exciter comprise at least two separate windings in parallel, one of these separate windings having a non-linear resistance in series with it.

JAMES COLQUHOUN MACFARLANE.
WILLIAM IAN MACFARLANE.

REFERENCES CITED

The following references are of record in the file of this patent:

UNITED STATES PATENTS

| Number | Name | Date |
|---|---|---|
| 1,054,937 | Pfeffer | Mar. 4, 1913 |
| 2,238,811 | Crever | Apr. 15, 1941 |
| 2,247,166 | Edwards et al. | June 24, 1941 |